United States Patent
Weidler et al.

(10) Patent No.: US 12,109,445 B2
(45) Date of Patent: Oct. 8, 2024

(54) FIRE EXTINGUISHING SYSTEM AND METHOD

(71) Applicant: The Boeing Company, Chicago, IL (US)

(72) Inventors: John A. Weidler, Lynnwood, WA (US); George A. McEachen, Mukilteo, WA (US); Robert S. Wright, Seattle, WA (US); Daniel W. Baisley, Lynnwood, WA (US); Sarah M. Wickham, Renton, WA (US); Mark D. Byers, Long Beach, CA (US)

(73) Assignee: The Boeing Company, Arlington, VA (US)

( * ) Notice: Subject to any disclaimer, the term of this patent is extended or adjusted under 35 U.S.C. 154(b) by 56 days.

(21) Appl. No.: 17/806,910

(22) Filed: Jun. 14, 2022

(65) Prior Publication Data
US 2023/0398388 A1   Dec. 14, 2023

(51) Int. Cl.
| A62C 31/00 | (2006.01) |
| A62C 3/08 | (2006.01) |
| A62C 35/02 | (2006.01) |
| A62C 35/68 | (2006.01) |
| B64D 45/00 | (2006.01) |

(52) U.S. Cl.
CPC ........... *A62C 31/005* (2013.01); *A62C 3/08* (2013.01); *A62C 35/023* (2013.01); *A62C 35/68* (2013.01); *B64D 45/00* (2013.01); *B64D 2045/009* (2013.01)

(58) Field of Classification Search
CPC ....... A62C 31/005; A62C 3/08; A62C 35/023; A62C 35/68; B64D 45/00; B64D 2045/009; B05B 1/08; F15C 1/22

USPC ................................ 239/589.1; 169/62
See application file for complete search history.

(56) References Cited

U.S. PATENT DOCUMENTS

| 3,998,386 A | 12/1976 | Viets et al. |
| 4,508,267 A * | 4/1985 | Stouffer ............... B05B 1/08 |
|  |  | 239/589.1 |
| 4,676,319 A * | 6/1987 | Cuthbertson .......... A62C 31/22 |
|  |  | 239/271 |
| 11,347,204 B2 * | 5/2022 | Rafferty ............... F15D 1/12 |
| 2003/0089796 A1 | 5/2003 | Kah |
| 2011/0315408 A1 | 12/2011 | Kallergis |
| 2015/0041157 A1 | 2/2015 | Mitchell |
| 2018/0064975 A1 | 3/2018 | Wright |

(Continued)

FOREIGN PATENT DOCUMENTS

| CN | 2817908 | 9/2006 |
| WO | WO20210150600 | 7/2021 |

OTHER PUBLICATIONS

Gabrielle C. Claus et al., "Internal Geometry and External Wall Effects on Fluidic Oscillator Behavior," Journal of Fluids Engineering, Nov. 2020, vol. 142.

(Continued)

*Primary Examiner* — Christopher S Kim

(57) ABSTRACT

A fire extinguishing system includes a storage vessel and a fluidic oscillator. The storage vessel is configured to contain a fire extinguishing agent. The fluidic oscillator is configured to receive the fire extinguishing agent from the storage vessel, and discharge a continuous jet of the fire extinguishing agent while oscillating the jet back and forth through a sweep angle.

20 Claims, 16 Drawing Sheets

(56) References Cited

U.S. PATENT DOCUMENTS

| | | |
|---|---|---|
| 2019/0011314 A1 | 1/2019 | Wright |
| 2019/0083834 A1 | 3/2019 | Wright |
| 2019/0126082 A1 | 5/2019 | Wright |
| 2019/0351269 A1 | 11/2019 | Phung |
| 2020/0094089 A1 | 3/2020 | Hagge et al. |
| 2020/0376503 A1 | 12/2020 | Wintering et al. |
| 2021/0223758 A1 | 7/2021 | Rafferty |
| 2021/0370111 A1 | 12/2021 | Diaz |
| 2022/0024599 A1* | 1/2022 | Cayssials ............... B64D 29/02 |

OTHER PUBLICATIONS

John C. Lin et al., "An Overview of Active Flow Control Enhanced Vertical Tail Technology Development," 54th AIAA Aerospace Sciences Meeting, San Diego, CA, Jan. 2016.

Wikipedia, "Trifluoroiodomethane," retrieved on May 7, 2022.

EPO, European Search Report, Appl. No. EP23162386, issued on Oct. 16, 2023.

\* cited by examiner

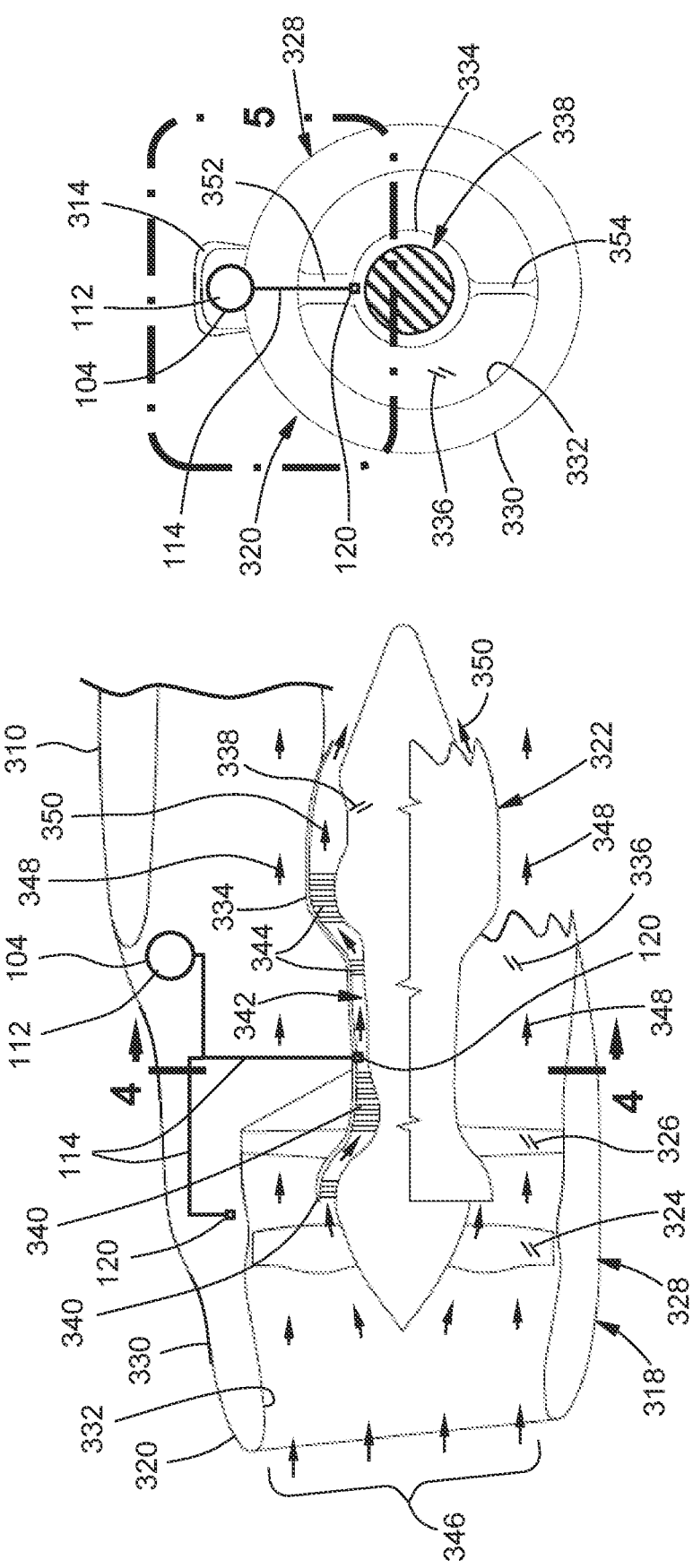

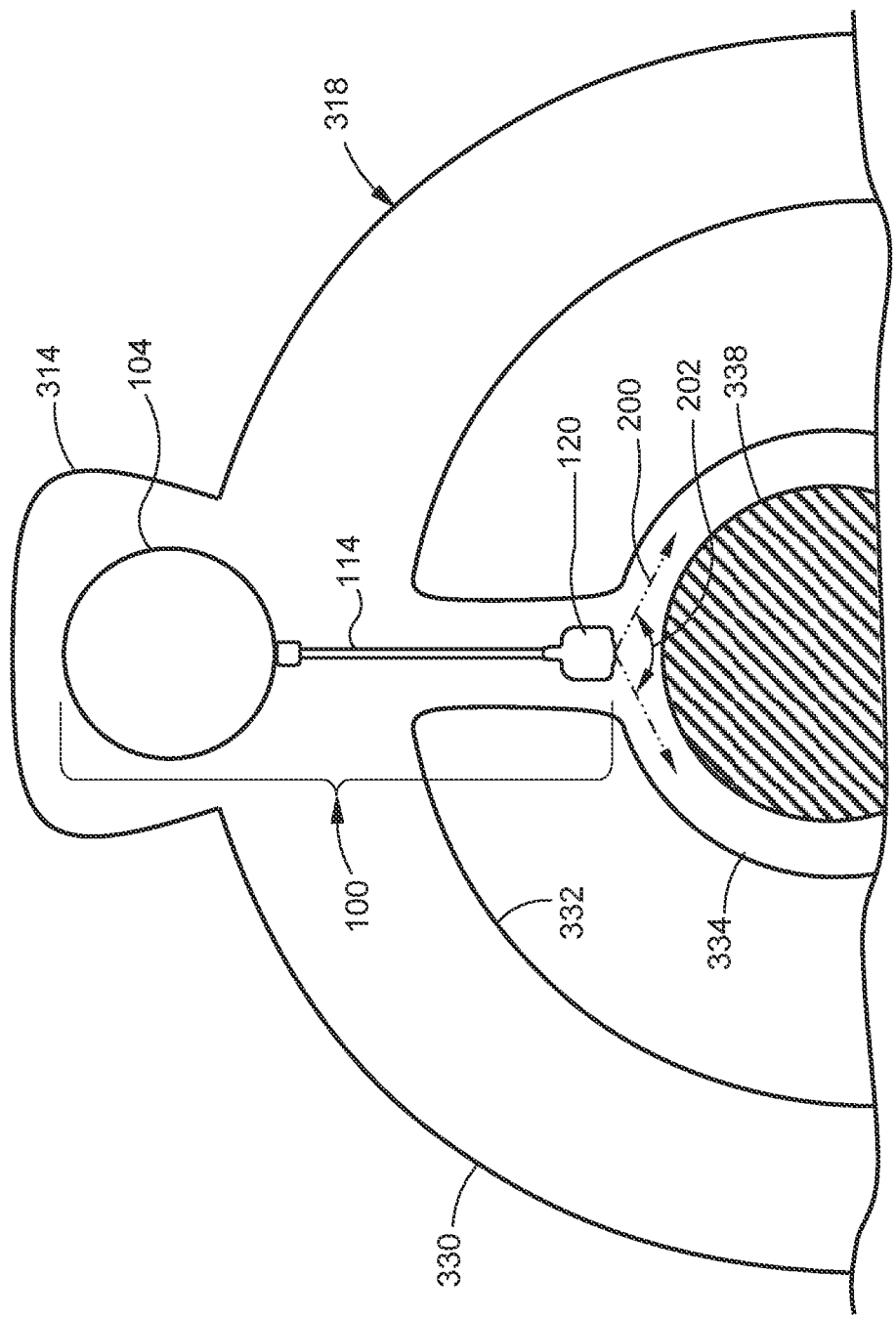

FIRE EXTINGUISHING SYSTEM AND METHOD

FIELD

The present disclosure relates generally to fire extinguishing systems and, more specifically, to a system and method for extinguishing a fire by discharging a jet of fire extinguishing agent in a manner that improves the rate of vaporization of the fire extinguishing agent.

BACKGROUND

Halon 1301 has traditionally been used as the fire extinguishing agent in the on-board fire extinguishing systems of commercial aircraft. Halon 1301 has a very low boiling temperature (e.g., approximately −71° F. or −57° C.), which causes it to have a high rate of vaporization, even at the cold atmospheric temperatures associated with the cruising altitudes of commercial aircraft. The high vaporization rate of Halon 1301 allows the agent in gaseous form to rapidly fill a space at a volumetric concentration level that is sufficient to extinguish an existing fire. In the case of a turbine engine or an auxiliary power unit (APU), a high vaporization rate is necessary due to the high engine ventilation rates caused by high speed air flow through the engine, and which would otherwise cause the agent to be swept away by the fast moving air prior to developing into a volumetric concentration level that is high enough to extinguish a fire.

In the mid 1990's, the production of Halon 1301 was banned in the U.S. and other industrialized countries due to its harmful effects on the ozone layer. Environmentally-friendly alternatives are being explored as a replacement for Halon 1301. Unfortunately, some of the agents being explored have a higher boiling temperature than Halon 1301. In cold environments and at high ventilation rates, the higher boiling temperature of such agents may result in a rate of vaporization that is lower than what is necessary to extinguish an engine fire.

As can be seen, there exists a need in the art for a system and method for extinguishing a fire using a fire extinguishing agent in a manner that results in a high vaporization rate of the agent, despite the agent having a higher boiling temperature than conventional agents.

SUMMARY

The above-noted needs associated with extinguishing a fire using a fire extinguishing agent are addressed by the present disclosure, which provides a fire extinguishing system having a storage vessel and a fluidic oscillator. The storage vessel is configured to contain a fire extinguishing agent. The fluidic oscillator is configured to receive the fire extinguishing agent from the storage vessel, and discharge a continuous jet of the fire extinguishing agent while oscillating the jet back and forth through a sweep angle.

Also disclosed is an aircraft having a compartment, a storage vessel, and a fluidic oscillator. The storage vessel is configured to contain a fire extinguishing agent in liquid form. The fluidic oscillator is configured to receive the fire extinguishing agent from the storage vessel, and discharge a continuous jet of the fire extinguishing agent into the compartment while oscillating the jet back and forth through a sweep angle.

Additionally disclosed is a method of extinguishing a fire. The method includes storing a fire extinguishing agent in a storage vessel, releasing the fire extinguishing agent to a solid state fluidic oscillator, and discharging a continuous jet of the fire extinguishing agent from the fluidic oscillator, while oscillating the jet back and forth through a sweep angle.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 3 is a longitudinal sectional view of the turbine engine of FIG. 2, and illustrating an example of a fire extinguishing system having a storage vessel fluidically coupled to a pair of fluidic oscillators, respectively positioned in the fan case and the engine core of the turbine engine.

FIG. 4 is a transverse sectional view of the turbine engine taken along line 4-4 of FIG. 3, and illustrating an example of the fluidic oscillator in the engine core.

FIG. 5 is an enlarged view of the portion of the turbine engine identified by reference numeral 5 of FIG. 4, and illustrating the fluidic oscillator discharging a jet in the region between the engine core and the fan duct inner wall of the turbine engine.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different examples or versions may be provided and should not be construed as limited to the examples or versions set forth herein. Rather, these examples or versions are provided so that this disclosure will be thorough and fully convey the scope of the disclosure to those skilled in the art.

This specification includes references to "one version" or "a version." Instances of the phrases "one version" or "a version" do not necessarily refer to the same version. Similarly, this specification includes references to "some examples," "one example," or "an example." Instances of the phrases "some examples," "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
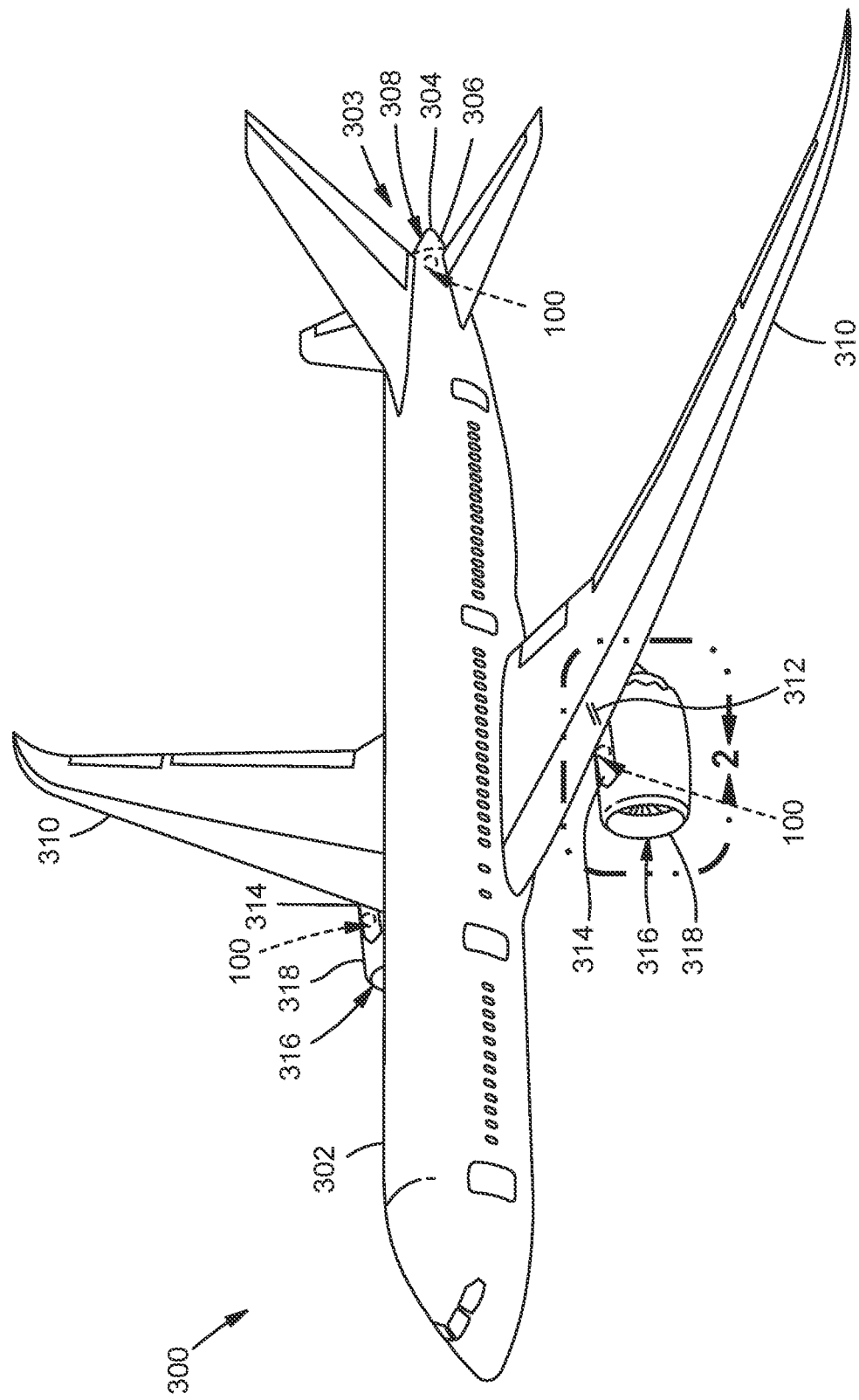
FIG. 1 is a perspective view of an aircraft having one or more fire extinguishing systems.
Figure 2:
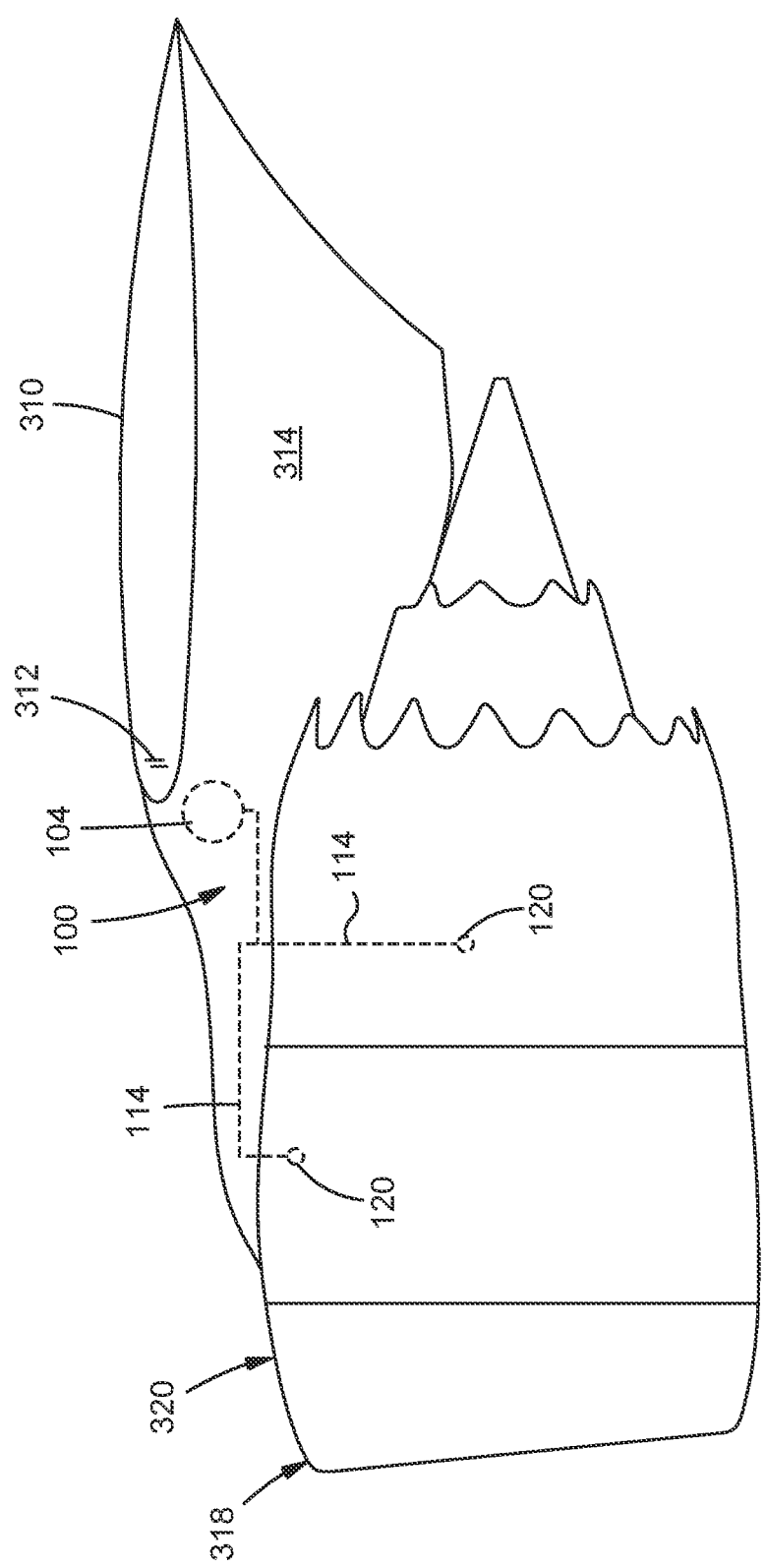
FIG. 2 is a side view of an example of a turbine engine of the aircraft of FIG. 1.

Referring now to the drawings, which illustrate various examples of the disclosure, shown in FIGS. 1-5 is an example of an aircraft 300 implementing the presently-disclosed fire extinguishing system 100. In FIG. 1, the aircraft 300 has a fuselage 302, a pair of wings 310, and a tail section 303. The aircraft 300 further includes a pair of propulsion units 316 in the form of turbine engines 318. As shown in FIG. 2, each turbine engine 318 is supported by a strut 314 coupling the turbine engine 318 to a wing 310. As shown in FIG. 1, the aircraft 300 also includes an auxiliary power unit (APU) 306 contained within an APU compartment 308. In the example shown, the APU compartment 308 is in the tail cone 304 at the aft end of the fuselage 302. The APU 306 may be described as a small jet engine for performing tasks such as starting the turbine engines 318, providing pneumatic power for cabin air conditioning, and providing electrical power for various electrical systems.

Figure 6:
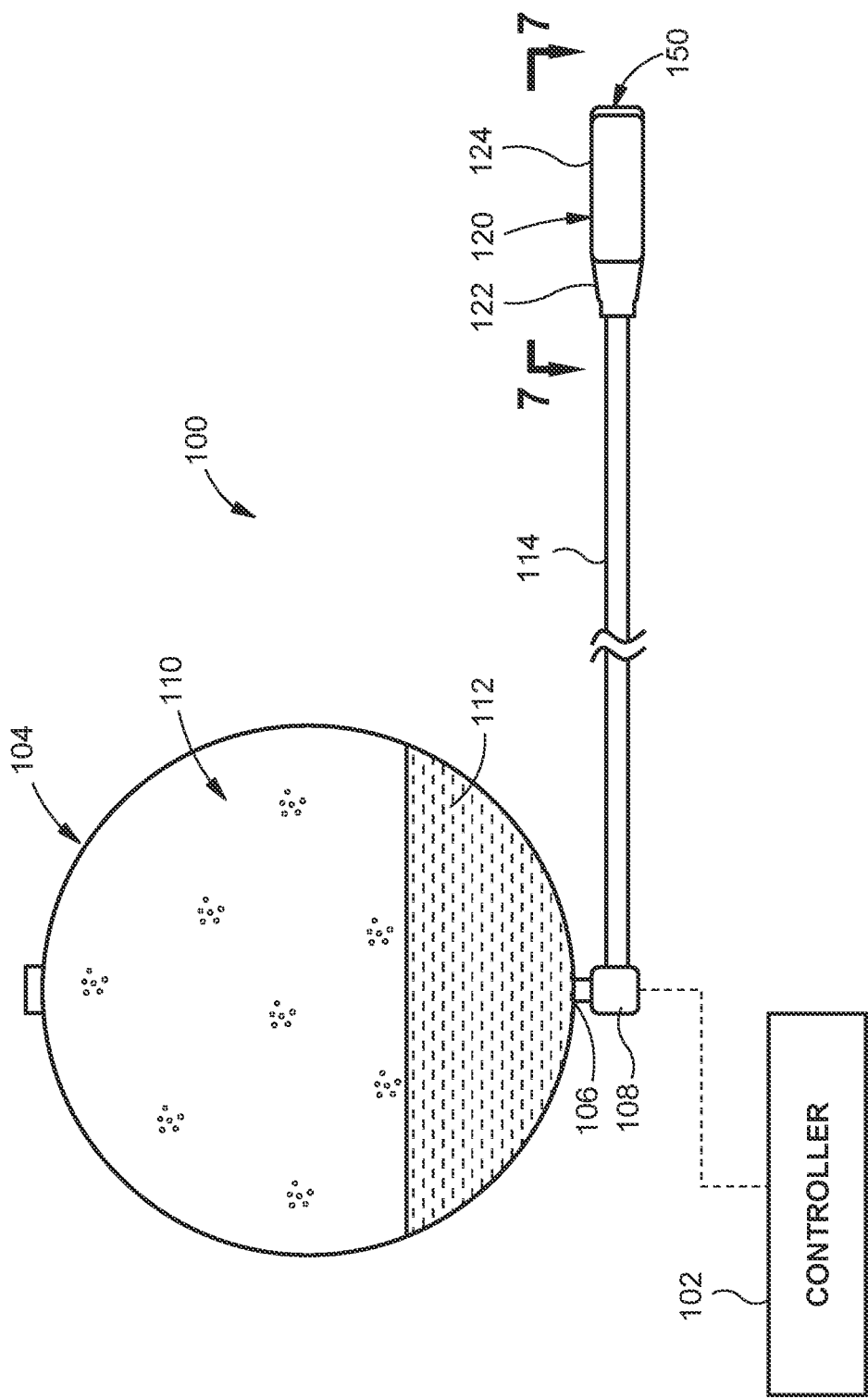
FIG. 6 is a schematic view of an example of a storage vessel containing a fire extinguishing agent, and an agent transfer tube coupling the storage vessel to a fluidic oscillator.
Figure 7:
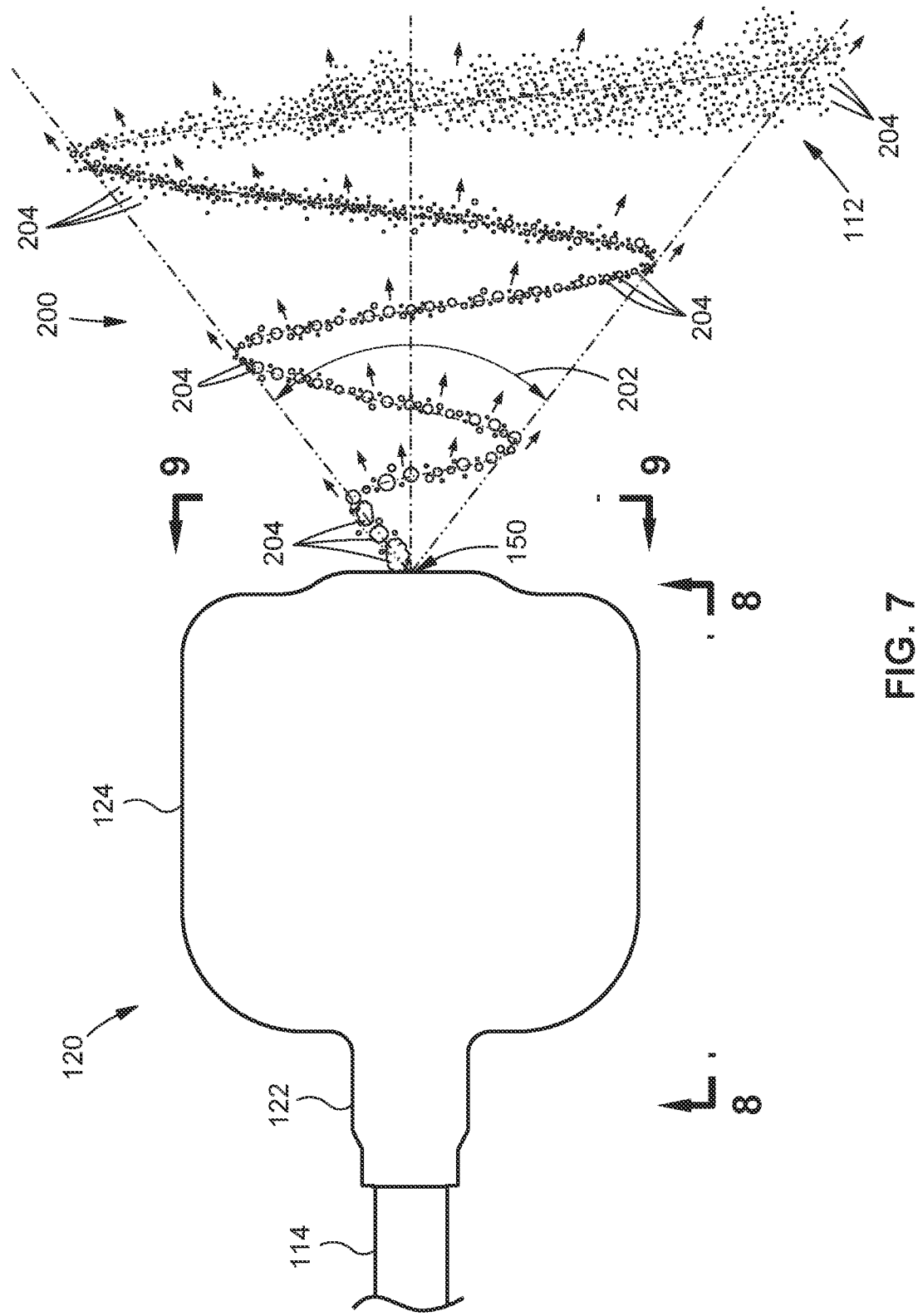
FIG. 7 is a top-down view of an example of a fluidic oscillator discharging an oscillating jet of fire extinguishing agent, and illustrating the distribution of the fire extinguishing agent during an instant in time.

In FIGS. 1-2, the aircraft 300 includes one or more fire extinguishing systems 100. In the example shown, a fire extinguishing system 100 is provided for each turbine engine 318. In addition, a fire extinguishing system 100 is provided for the APU 306. As described in greater detail below, each fire extinguishing system 100 includes at least one storage vessel 104 (FIG. 2) for containing a fire extinguishing agent 112 (FIG. 6), and at least one fluidic oscillator 120 (FIG. 2) coupled to the storage vessel 104. Each fluidic oscillator 120 is configured to receive the fire extinguishing agent 112 from one or more of the storage vessels 104, and discharge a continuous jet 200 (FIG. 7) of the fire extinguishing agent 112 while oscillating the jet 200 back and forth through a sweep angle 202 (FIG. 7).

The fire extinguishing agent 112 (FIG. 6) is in liquid form in the storage vessel 104 (FIG. 6), although a portion of the fire extinguishing agent 112 may be in vapor form. As described below and shown in FIG. 7, the fluidic oscillator 120 atomizes the fire extinguishing agent 112 as the jet 200 is discharged from the fluidic oscillator 120. As the liquid droplets 204 of the jet 200 are discharged into the local area, the droplets 204 break up into smaller droplets 204 due to shearing action with the ambient air. The reduction in droplet size results in an increase in the aggregate surface area of the fire extinguishing agent 112, which improves the rate of vaporization phase change, allowing the fire extinguishing agent 112 to vaporize when its boiling temperature is above the temperature of the local area.

Referring to FIGS. 2-5, shown is an example of the installation of the fire extinguishing system 100 in a turbine engine 318. The fire extinguishing system 100 includes a storage vessel 104, a plurality of agent transfer tubes 114 coupled to the storage vessel 104, and a fluidic oscillator 120 installed on the end of each agent transfer tube 114. Although the storage vessel 104 is shown installed in the strut 314, the storage vessel 104 may be mounted at any location on the aircraft 300, such as in the wing leading edge 312, in a wheel well (not shown) of a main landing gear, or in other locations. Furthermore, although a single storage vessel 104 is mounted in the strut 314 in FIG. 2, a fire extinguishing system 100 may include any number of storage vessels 104, each of which may be fluidically coupled to one or more fluidic oscillators 120, respectively via one or more agent transfer tubes 114.

The example turbine engine 318 in FIGS. 2-5 is a turbofan engine. As shown in FIG. 3, the turbofan engine has an engine nacelle 320, including a fan cowl 330 and a fan duct outer wall 332. The fan cowl 330 and the fan duct outer wall 332 collectively define a fan case 328, which surrounds the rotating fan blades 324 and the stationary stator blades 326. The turbine engine 318 further includes a fan duct inner wall 334 and an engine core 338. The engine core 338 is surrounded by the fan duct inner wall 334. As shown in FIG. 4, the turbine engine 318 includes an upper bifurcation 352 (FIG. 4) and a lower bifurcation 354 (FIG. 4), which enclose the strut and engine accessories such as drain tubes.

As shown in FIGS. 3-4, the air flow 346 entering the turbofan engine is divided into a bypass flow 348, and a core flow 350. The bypass flow 348 passes through the fan duct 336. The core flow 350 passes through the annular gap between the fan duct inner wall 334 and the engine core 338. The engine core 338 includes a complex arrangement of compressors 340, a combustor 342, and turbines 344. The compressors 340 pressurize the air in the core flow 350 prior to delivery to the combustor 342. In the combustor 342, fuel is injected into the air and ignited, resulting in a superheated, high-pressure air-fuel mixture that is combusted prior to passing into the turbines 344. The turbines 344 expand the combustion gases to produce exhaust thrust from the core flow 350. The turbines 344 also drive the fan blades 324 to generate thrust from the bypass flow 348.

In FIGS. 2-5, the fire extinguishing system 100 includes two fluidic oscillators 120. Each fluidic oscillator 120 is coupled to the storage vessel 104 by a system of agent transfer tubes 114. FIG. 3 shows one of the fluidic oscillators 120 mounted above the engine core 338 in the region between the fan duct inner wall 334 and the engine core 338. The fluidic oscillator 120 above the engine core 338 is configured to discharge a jet 200 of fire extinguishing agent 112 alternately (i.e., due to oscillation of the jet 200) on opposite sides of the engine core 338, as shown in FIG. 5.

As shown in FIG. 3, a fluidic oscillator 120 is mounted in the fan case 328 between the fan cowl 330 and the fan duct outer wall 332, and is configured to discharge a jet 200 of fire extinguishing agent 112 alternately (i.e., due to oscillation of the jet 200) on opposite sides of the fan case 328. However, as mentioned above, the fire extinguishing system 100 may include any number of fluidic oscillators 120 mounted at any one of a variety of locations on a turbine engine 318.

The turbine engines 318 of an aircraft 300 typically have a high ventilation rate, which is the rate of air flow 346 (FIG. 3) through the turbine engine 318. Advantageously, in such environments, the oscillating motion of the jet 200 (FIG. 7) aids in mixing the droplets 204 (FIG. 7) with the fast moving air, creating a homogenous mix of air, vaporized fire extinguishing agent 112, and very small liquid droplets 204 of the fire extinguishing agent 112. With the addition of heat in localized regions of the turbine engine 318, the liquid droplets 204 rapidly turn into vapor, allowing the mixture of fire extinguishing agent 112 and air to get to needed locations within the complex engine geometry, and at the required volumetric concentration levels (e.g., 5 percent) within a very short time period (e.g., on the order of 1-2 seconds), prior to being swept away by the fast moving air flow 346.

Although FIGS. 2-5 show a fire extinguishing system 100 for a turbofan engine, the fire extinguishing system 100 may be implemented in any one of a variety of alternative types of turbine engines 318, including turbojet engines, turboprop engines, and turboshaft engines (e.g., of a helicopter). Furthermore, the fire extinguishing system 100 may be implemented in other types of engines including, but not limited to, internal combustion engines. In addition, the fire extinguishing system 100 may be implemented in other locations on an aircraft 300, such as in a wheel well, an electronics bay, a cargo bay, a baggage compartment, or lavatory, if the fire extinguishing agent 112 is safe for use in spaces occupied by humans.

The fire extinguishing system 100 is not limited for use in aircraft 300 of the type shown FIG. 1, and may be implemented for use in any one of a variety of different types of manned or unmanned aircraft, including any type of fixed-wing aircraft, any type of rotary-wing aircraft, and any type of civil, commercial, and military aircraft. In addition, the fire extinguishing system 100 may be implemented for use in any one of a variety of other types of vehicular applications, including land-based vehicles, marine vessels, space vehicles, and/or other types of vehicles. Furthermore, the fire extinguishing system 100 may be implemented in stationary applications, such as in buildings, power plants, manufacturing facilities, and other applications where there is a risk of fire.

Referring to FIG. 6, shown is a schematic illustration of an example of a storage vessel 104, and an agent transfer tube 114 coupling the storage vessel 104 to a fluidic oscillator 120. Although shown in a spherical configuration, the storage vessel 104 may be provided in any one of a variety of alternative shapes, such as a cylindrical shape or other shape. The storage vessel 104 is configured to contain a fire extinguishing agent 112 in liquid form, although a portion of the fire extinguishing agent 112 may be in vapor form. In the example shown, the fire extinguishing agent 112 occupies approximately 20 percent of the volume of the storage vessel 104. The remainder of the storage vessel 104 if occupied by a pressurant 110, such as nitrogen or other inert gas. The storage vessel 104 is configured to withstand high pressures, such as up to 100 psi or more. Toward this end, the storage vessel 104 may be formed of a metallic material such as stainless steel or other metallic material. Alternatively, the storage vessel 104 may be formed of a non-metallic material (e.g., carbon fiber) that is chemically non-reactive with the fire extinguishing agent 112.

Examples of the types of fire extinguishing agent 112 that may be contained within the storage vessel 104 for dispersion by the fluidic oscillator 120 include, but are not limited to, trifluoroiodomethane ($CF_3I$), fluoroketone (Novec-1230™), pentafluoroethane (HFC-125™), and bromotrifluoromethane (Halon-1301™). The fluidic oscillator 120 may also be configured to disperse agents such as sodium bicarbonate ($NaHCO_3$), or a sodium bicarbonate-based agent. However, any one of a variety of liquid fire extinguishing agents, or liquid/gas fire extinguishing agents, may be used in the fire extinguishing system 100. For aircraft 300, trifluoroiodomethane ($CF_3I$), fluoroketone (Novec-1230™), and pentafluoroethane (HFC-125) are preferable replacements for bromotrifluoromethane (Halon-1301™), due to their ability to be atomized by the fluidic oscillator 120 in the cold environments common to high cruising altitudes. The type of fire extinguishing agent 112 dictates the geometry and dimensions of the internal cavity 132 (FIG. 11) of the fluidic oscillator 120 in order to achieve the desired performance characteristics of the jet 200. In this regard, different fire extinguishing agents 112 may dictate different geometries and dimensions of the internal cavity 132.

Referring still to FIG. 6, the agent transfer tube 114 fluidically couples the vessel outlet 106 of the storage vessel 104 to the fluidic oscillator 120. Although FIG. 6 shows a single agent transfer tube 114 attached to the storage vessel 104, a fire extinguishing system 100 may have multiple agent transfer tubes 114 extending from a single storage vessel 104. At least one fluidic oscillator 120 is coupled to the end of each agent transfer tube 114. The agent transfer tubes 114 route the fire extinguishing agent 112 to specific locations where fire protection is required. In the case of an aircraft 300, the agent transfer tubes 114 route the fire extinguishing agent 112 to specific locations in a compartment, such as an engine compartment 322 (FIG. 3) of a turbine engine 318 (FIG. 3), or an APU compartment 308 (FIG. 1) in the tail cone 304 (FIG. 1) of a fuselage 302. The agent transfer tubes 114 may be formed of a metallic material, such as stainless steel, or a non-metallic material, such as a polymeric material, or any one of a variety of other materials that are compatible with the fire extinguishing agent 112.

Referring to FIGS. 6-7, the fluidic oscillator 120 is coupled to the end of the agent transfer tube 114, via threadable engagement, via welding, or other means. In the example of FIG. 6, the fire extinguishing system 100 includes an agent discharge initiator 108 coupled to the vessel outlet 106 of the storage vessel 104. In some examples, the vessel outlet 106 includes a metallic disc or diaphragm (not shown) that seals the fire extinguishing agent 112 and pressurant 110 within the storage vessel 104. The agent discharge initiator 108 is communicatively coupled to a controller 102 which, when commanded (e.g., by the flight crew), causes the agent discharge initiator 108 to burst or break the diaphragm. When the diaphragm is broken, the pressurant 110 inside the storage vessel 104 forces the fire extinguishing agent 112 out of the storage vessel 104, through the agent transfer tube 114, and into the fluidic oscillator 120.

Referring to FIG. 7, the fluidic oscillator 120 discharges the fire extinguishing agent 112 as a continuous high-pressure jet 200, while oscillating the jet 200 back and forth through a sweep angle 202, in a two-dimensional direction. As mentioned earlier, the fluidic oscillator 120 atomizes the fire extinguishing agent 112 as the jet 200 is discharged, thereby increasing the aggregate surface area of the fire extinguishing agent 112 due to the continuous breakup of the droplets 204 into smaller droplets 204. The increase in the aggregate surface area of the fire extinguishing agent 112 increases the rate of vaporization of the fire extinguishing agent 112.

The continuous reduction in the size of the droplets 204 in the jet 200 is a result of the droplets 204 having an unobstructed path during oscillation of the jet 200. More specifically, as shown in FIG. 7, during each sweep of the jet 200 from one side of the sweep angle 202 to the other, the droplets 204 within each sweep have an unobstructed path into the local ambient air, causing the droplets 204 to continuously break up into smaller droplets 204 due to shearing action with the ambient air. In one example, the fluidic oscillator 120 is configured to discharge the jet 200 in a manner causing the jet 200 to break up into droplets 204 having a droplet size (e.g., a diameter) of less than 150 microns.

Figure 11:
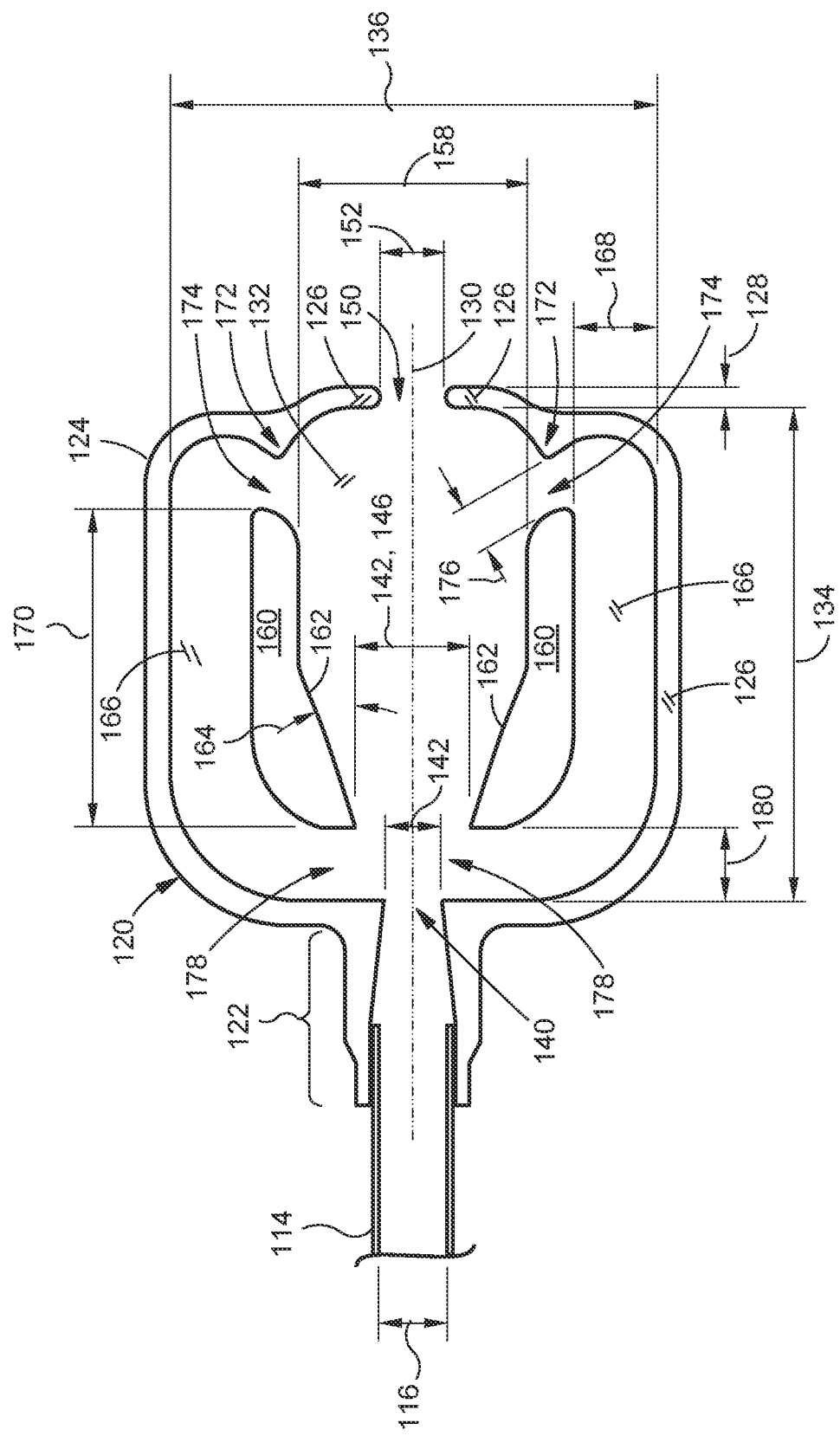
FIG. 11 is a cross-sectional view of the fluidic oscillator of FIG. 7, illustrating an internal cavity containing a pair of flow separators separating a mixing region respectively from a pair of feedback channels.

The sweep angle 202 of the jet 200 is application specific, and some applications require a relatively large sweep angle 202, while other applications require a relatively small sweep angle 202. In FIG. 7, the fluidic oscillator 120 is configured to oscillate the jet 200 through a sweep angle 202 of approximately 60 degrees. In some examples, the fluidic oscillator 120 can be configured (i.e., designed) such that the jet 200 oscillates through any sweep angle 202 in the range of 30-120 degrees. In other examples, the fluidic oscillator 120 can be configured such that the sweep angle 202 is less than 30 degrees, or greater than 120 degrees.

The fluidic oscillator 120 will oscillate the jet 200 from side to side at an oscillating frequency that is based on a number of factors including, but not limited to, the mass flow rate, and the internal geometry of the fluidic oscillator 120, as described in greater detail below. In some examples, the fluidic oscillator 120 is configured to oscillate the jet 200 at an oscillating frequency in the range of 5-20 Hertz (Hz). However, the fluidic oscillator 120 may be configured to oscillate the jet 200 at frequencies less than 5 Hz or greater than 20 Hz.

Advantageously, the unobstructed path of the droplets 204 in the high-pressure jet 200 emitted by the presently-disclosed fluidic oscillator 120 provides better penetrative capability than the low-pressure plume emitted by the simple nozzle (e.g., the free end of a tube) of a conventional fire suppression system (not shown). Another benefit of the unobstructed path is that heavy particles, such as metallic fragments of a burst disc, will travel straight through the local air mass without restriction. Furthermore, in contrast to a conventional nozzle which emits a plume in a single direction, the side-to-side sweeping motion of the jet 200 in the presently-disclosed fluidic oscillator 120 results in the distribution of the fire extinguishing agent 112 across a relatively wide area, thereby allowing the fire extinguishing agent 112 to penetrate into different directions of a compartment (e.g., an engine compartment 322). In this regard, the presently-disclosed fire extinguishing system 100 avoids the need for multiple nozzles pointing in different directions, as is required in conventional fire suppression systems.

Referring to FIGS. 8-11, shown is the external and internal geometry of the fluidic oscillator 120 of FIG. 7. The fluidic oscillator 120 is a solid state device with no moving parts. In the example shown, the fluidic oscillator 120 has a main body 124. In addition, the fluidic oscillator 120 has a tube flange 122 for attachment to the end of the agent transfer tube 114. When viewed from a top-down perspective, the external shape of the main body 124 is generally square with rounded corners. In the example shown, the main body 124 has external dimensions of a body length of approximately 1.9 inches, a body width of approximately 1.9 inches, and a body height of approximately 0.65 inch. Although shown having a generally square shape, the main body 124 may be provided in alternative sizes and alternative shapes, such as a rounded or circular shape, when viewed from a top-down direction. The fluidic oscillator 120 may be formed by casting, machining, additively manufacturing (e.g., 3D printing), and/or any one of a variety of other manufacturing techniques. The fluidic oscillator 120 may be formed of a metallic material, such as stainless steel, or any other metallic or non-metallic material that is high-temperature resistant, and chemically non-reactive with the fire extinguishing agent 112.

Referring to FIG. 11, the main body 124 has a power nozzle 140, an internal cavity 132, and an exit throat 150. The power nozzle 140 is located where the tube flange 122 intersects the main body 124. The power nozzle 140 receives the fire extinguishing agent 112 from the agent transfer tube 114, and directs the fire extinguishing agent 112 into the internal cavity 132. In the example shown, the power nozzle 140 has a circular cross-sectional shape that is complementary to the circular cross-sectional shape of the agent transfer tube 114. In FIG. 11 in which the fluidic oscillator 120 is configured to disperse trifluoroiodomethane (CF$_3$I), the power nozzle 140 has a power nozzle diameter 142 of approximately 0.22 inch. However, the power nozzle diameter 142 may have a different size, based on the mass flow rate of the fire extinguishing agent 112.

Referring still to the example of FIG. 11, the internal cavity 132 is enclosed by a body wall 126 of the main body 124. In the example shown, the wall thickness 128 of the body wall 126 is approximately 0.060 inch. In the example shown, the cavity length 134 is approximately 1.78 inch, the cavity width 136 is approximately 1.76 inch, and the cavity height (not shown) may be approximately 0.64 inch. However, the geometry of the internal cavity 132 is sized according the desired flow characteristics of the jet 200. For example, the dimensions of the internal cavity 132 dictate the desired velocity and/or mass flow rate of the jet 200, the oscillation frequency, the sweep angle 202, and other characteristics.

Figure 9:
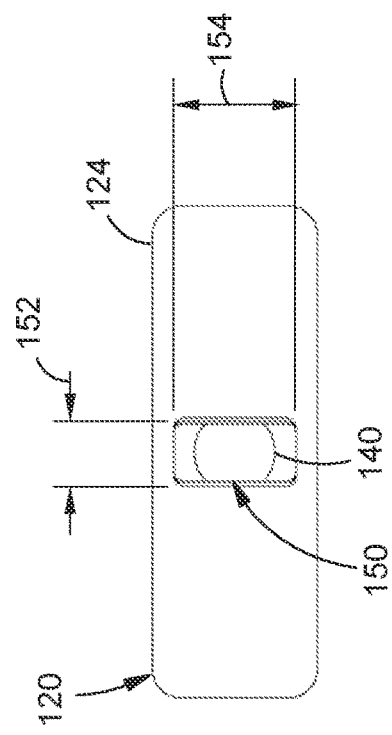
FIG. 9 is an end view of the fluidic oscillator of FIG. 7.
Figure 10:
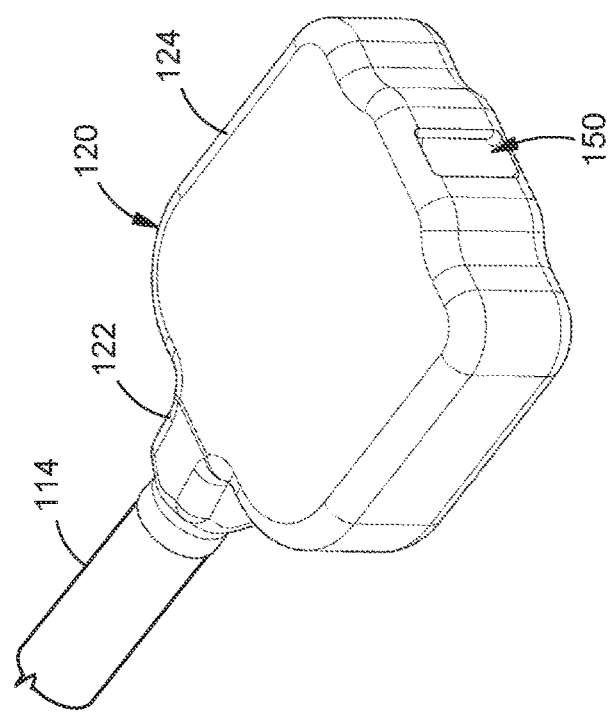
FIG. 10 is a top-down perspective view of the fluidic oscillator of FIG. 7.
Figure 8:
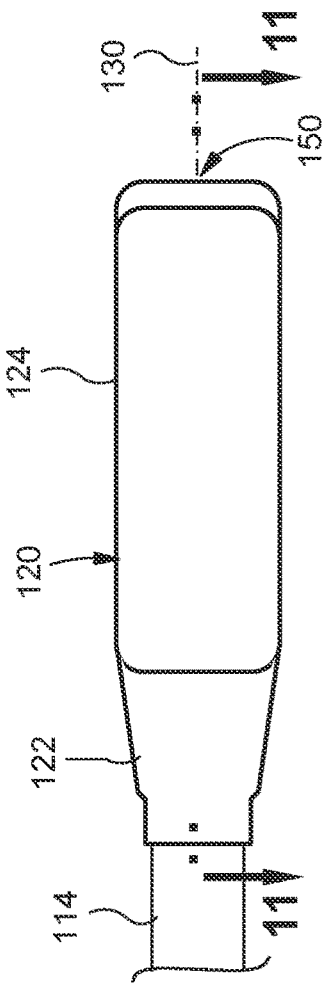
FIG. 8 is a side view of the fluidic oscillator of FIG. 7.

The exit throat 150 is the fluid outlet of the main body 124, and is the location where the jet 200 is discharged. In FIG. 9, the exit throat 150 has a rectangular cross-sectional shape when the main body 124 is viewed from the end. In the example shown, the exit throat 150 has an exit throat height 154 of approximately 0.44 inch, and an exit throat width 152 of approximately 0.20 inch. However, as with the power nozzle 140, the size (i.e., cross-sectional area) of the exit throat 150 may be based, at least in part, on the desired mass flow rate of the jet 200. As an alternative to the rectangular cross-sectional shape shown in FIG. 9, the exit throat 150 may be provided in a circular cross-sectional shape, or other cross-sectional shape.

When the main body 124 is viewed in cross section in a top-down direction as shown in FIG. 11, each side of the exit throat 150 is defined by a full radius (i.e., a bullnose radius) on each of the opposing body walls 126. In the example shown, the wall thickness 128 of the body walls 126 on opposite sides of the exit throat 150 is less than the exit throat width 152. The main body 124 terminates at the exit throat 150 where the jet 200 is discharged. In this regard, the fluidic oscillator 120 lacks external structure downstream of the exit throat 150, such as a diverging exit nozzle defining opposing sides of the sweep angle 202.

The internal geometry includes a pair of flow separators 160 separating the mixing region 156 respectively from a pair of feedback channels 166. The mixing region 156 is bounded on opposite sides by the flow separators 160, and is bounded on opposite ends by the power nozzle 140 and the exit throat 150. Near the power nozzle 140, the ends of the flow separators 160 are spaced apart from each other by a spacing defined as the control nozzle 142 which, in the example shown, has a control nozzle width 146 of approximately 0.41 inch. On an opposite end of the internal cavity 132, the spacing between the flow separators 160 defines the mixing region width 158 which, in the example shown, is approximately 0.82 inch. The internal geometry of the fluidic oscillator 120 is symmetrical about a central axis 130, which is centered on the power nozzle 140 and the exit throat 150.

Referring still to FIG. 11, the pair of feedback channels 166 extend respectively around the pair of flow separators 160. Each feedback channel 166 is fluidically coupled at opposite ends to the mixing region 156 (FIG. 12) respectively proximate the power nozzle 140 and the exit throat 150. In this regard, each feedback channel 166 has a channel entrance 174 located proximate the exit throat 150, and a channel exit 178 located proximate the power nozzle 140. In the example shown, the channel entrance width 176 is approximately 0.18 inch, the feedback channel width 168 is approximately 0.31 inch, the feedback channel length 170 is approximately 1.30 inch, and the channel exit width 180 is approximately 0.28 inch. However, as indicated above, selection of the dimensions of the internal geometry is dictated by the desired flow characteristics of the jet 200.

Each flow separator 160 has a Coanda surface 162, oriented at a Coanda surface angle 164. The Coanda surface angle 164 may have a substantial effect on the oscillating frequency of the jet 200. In the example shown, the Coanda surface angle 164 of each flow separator 160 is approximately 30 degrees. However, the Coanda surface angle 164 is one of multiple variables of the internal geometry that can be adjusted (e.g., during the design process) to achieve the desired flow characteristics of the jet 200.

Figure 12:
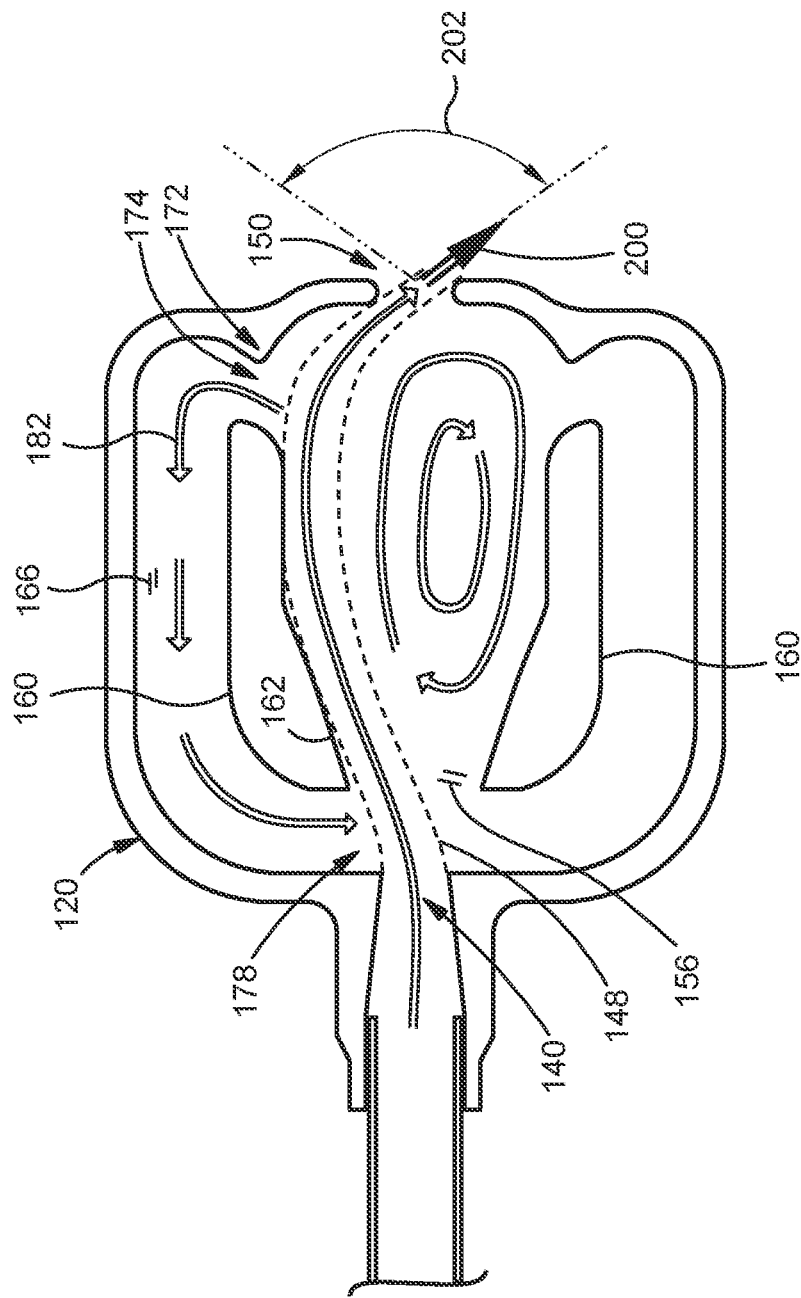
FIG. 12 is a schematic view of a main flow of the fire extinguishing agent entering a power nozzle (i.e., the fluid inlet of the fluidic oscillator), and moving through the mixing region toward the exit throat (i.e., the fluid outlet), and further illustrating a separation vortex generated on one side of the mixing region, and which urges the main flow toward one of the flow separators.
Figure 13:
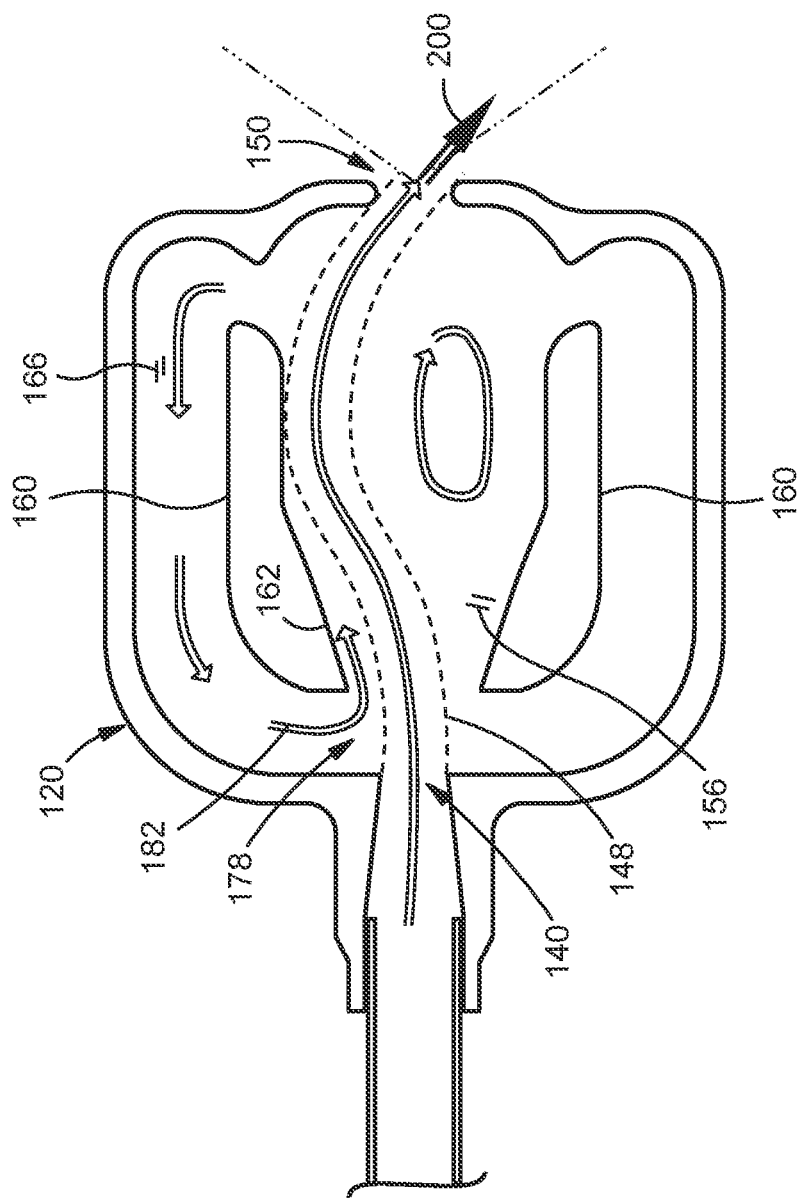
FIG. 13 shows further progression of the flow dynamics within the fluidic oscillator, and illustrating a portion of the main flow entering the feedback channel proximate the exit throat on one side of the mixing region, and exiting the feedback channel proximate the power nozzle, and pushing the main flow across the mixture region, initiating a change in the direction of the jet, back across the sweep angle.

Referring to FIGS. 12-18, shown are illustrations of the progression of the flow dynamics within the fluidic oscillator 120 that result in the oscillation of the jet 200 from one side of the sweep angle 202 (FIG. 12), to the opposite side, and back. The pair of flow separators 160 are configured to alternately guide the main flow 148 toward the exit throat 150. As a result of the Coanda effect, the main flow 148 entering the power nozzle 140 initially attaches to the Coanda surface 162 of one of the flow separators 160, as shown in FIG. 12. Due to attachment to one flow separator 160, a portion of the main flow 148 is diverted into the channel entrance 174 of the feedback channel 166 defined by that flow separator 160. The portion that is diverted into the feedback channel 166 is referred to as the feedback flow 182. The internal cavity 132 includes a feedback flow guide 172 on each side of the exit throat 150. Each feedback flow guide 172 is a wedge-shaped structure protruding from the body wall 126 near the exit throat 150. Each feedback flow guide 172 guides the feedback flow 182 into the feedback channel 166.

Figure 14:
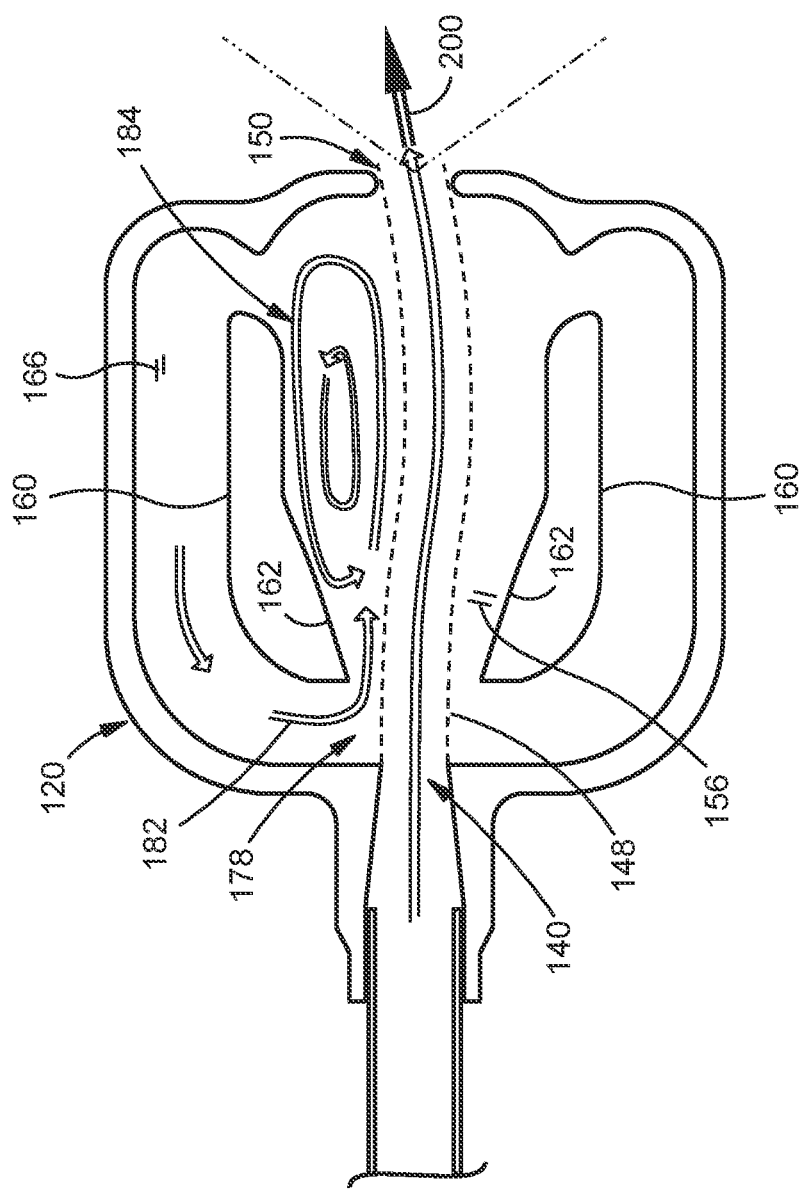
FIG. 14 shows further progression of the flow dynamics within the fluidic oscillator, and illustrating the enlargement of the separation vortex as fed by the feedback flow from the feedback channel, and causing further change of the jet across the sweep angle.
Figure 15:
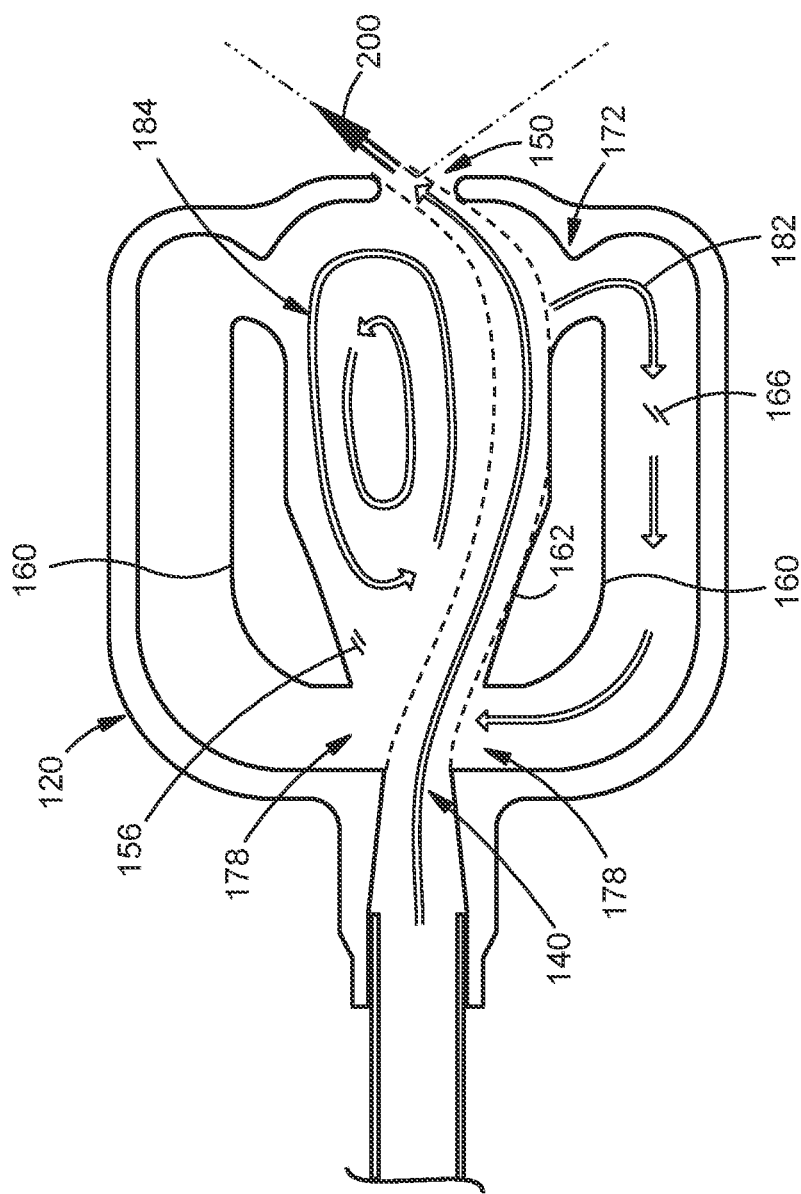
FIG. 15 shows further progression of the flow dynamics within the fluid oscillator, and illustrating the enlargement of the separation vortex to a point that the main flow is pushed back across the mixing region against the flow separator on the opposite side, causing the jet to discharge from the fluidic oscillator in a direction parallel to the opposite extreme of the sweep angle, and further illustrating a portion of the main flow entering the feedback channel on the opposite side of the mixing region.

Referring to FIGS. 12-15, the feedback flow 182 in one of the feedback channels 166 pushes against the main flow 148 as the feedback flow 182 passes through the channel exit 178 proximate the power nozzle 140. As a result, the feedback flow 182 pushes the main flow 148 away from the Coanda surface 162, and toward the flow separator 160 on the opposite side of the mixing region 156. In addition, the feedback flow 182 facilitates the development of a separation vortex 184 between the flow separator 160 and the main flow 148, as shown in FIGS. 14-15. When the separation vortex 184 grows large enough, the separation vortex 184 pushes the main flow 148 against the flow separator 160 on the opposite side of the mixing region 156, aided by the tendency for the main flow 148 to attach (i.e., due to the Coanda effect) to the Coanda surface 162 of the opposite flow separator 160. As shown in FIG. 15, the attachment of the main flow 148 to the flow separator 160 on the opposite side the mixing region 156 results in the jet 200 being swept through the sweep angle 202.

Figure 16:
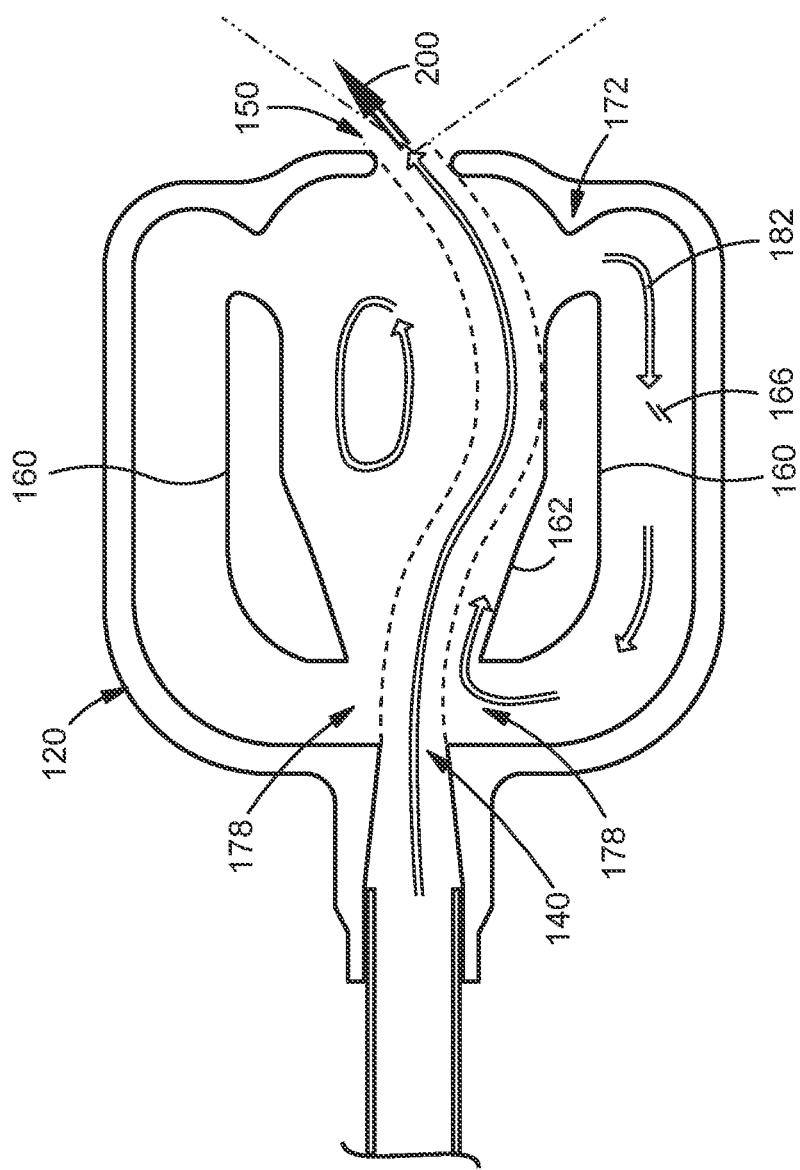
FIG. 16 shows further progression of the flow dynamics within the fluidic oscillator, in a manner similar to that of FIG. 13 as described above.
Figure 17:
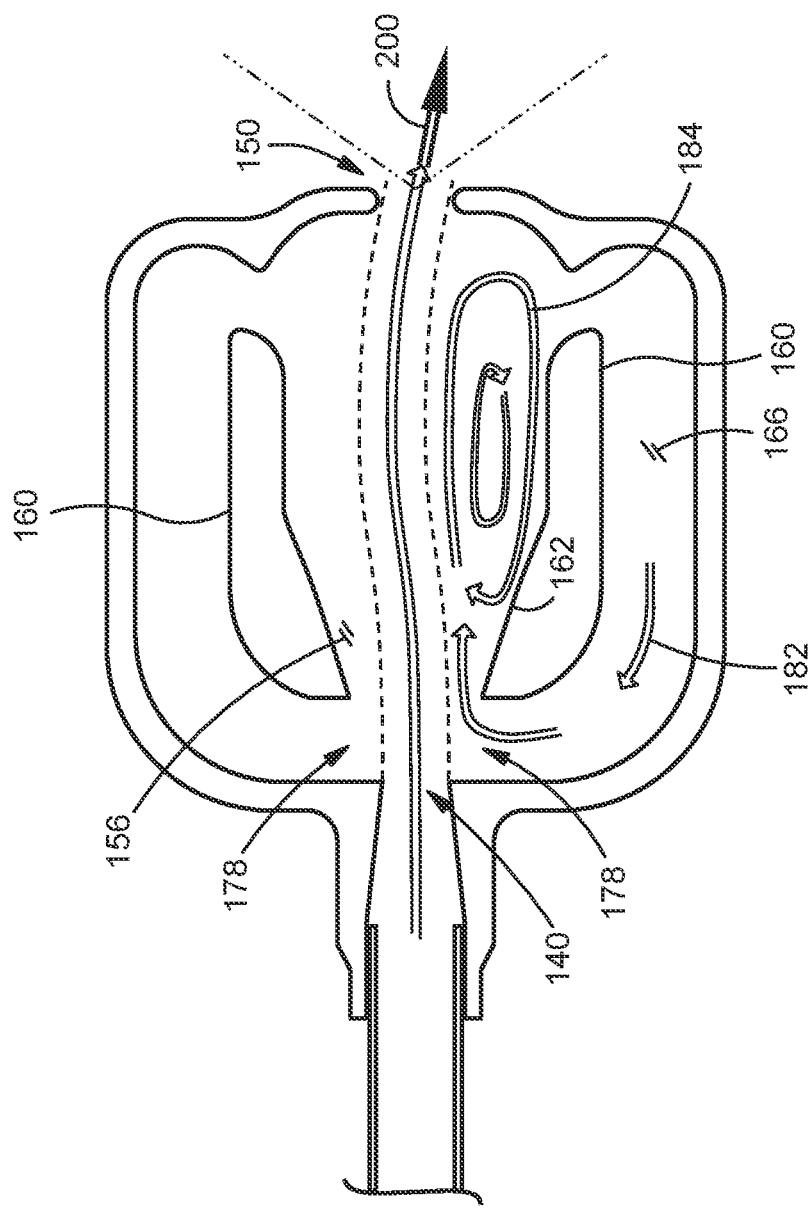
FIG. 17 shows further progression of the flow dynamics within the fluidic oscillator, in a manner similar to that of FIG. 14 as described above.
Figure 18:
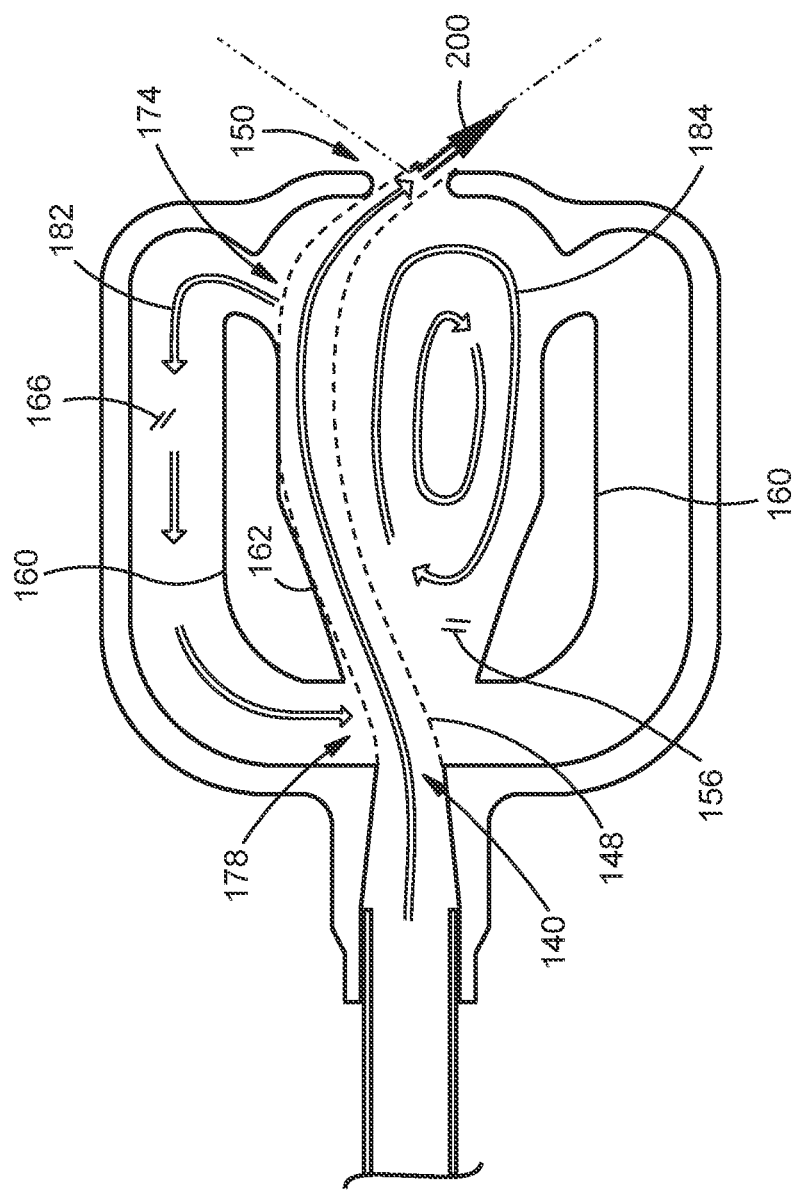
FIG. 18 shows further question of the flow dynamics within the fluidic oscillator, in a manner similar to that of FIG. 15 as described above.

FIGS. 16-18 schematically illustrate the process by which the jet 200 sweeps back to the opposite side of the sweep angle 202, by undergoing the same flow dynamics illustrated in FIGS. 12-15. The flow dynamics within the fluidic oscillator 120 cause the jet 200 to oscillate continuously, until the flow of fire extinguishing agent 112 into the fluidic oscillator 120 is substantially reduced or stops.

Figure 19:
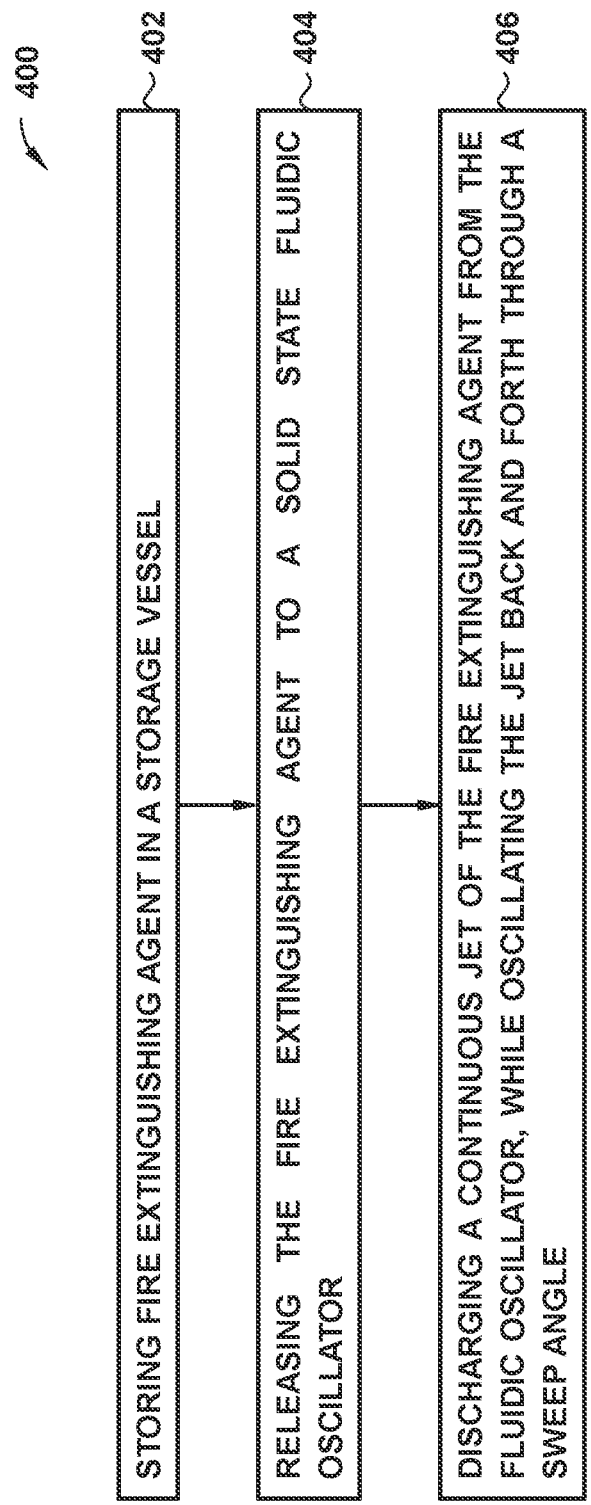
FIG. 19 is a flowchart of operations included in a method of extinguishing a fire.

Referring now to FIG. 19, shown are operations included in a method 400 of extinguishing a fire. The method includes step 402 of storing fire extinguishing agent 112 in liquid form in a storage vessel 104, as shown in the example of FIG. 6. As indicated above, in addition to liquid form, a portion of the fire extinguishing agent 112 may be in vapor form. In the example show, the fire extinguishing agent 112 occupies a smaller portion of the volume of the storage vessel 104 than the pressurant 110. However, the volume of fire extinguishing agent 112 relative to the volume of pressurant 110 may vary, depending upon the desire operating characteristics of the fire extinguishing system 100. Further in this regard, during normal operations, the volumetric ratio of fire extinguishing agent 112 to pressurant 110 will vary a bit as temperature changes cause the fire extinguishing agent 112 and pressurant 110 to move into and out of solution. In the example shown, the fire extinguishing agent 112 ($CF_3I$) occupies approximately 20 percent of the volume of the storage vessel 104, and the remainder of the storage vessel 104 is occupied by the pressurant 110, which is nitrogen or other inert gas. However, as mentioned above, the storage vessel 104 may contain other volumetric ratios of fire extinguishing agent 112 to pressurant 110. The volumetric ratio constitutes another variable that affects the operating characteristics the fire extinguishing system 100 at a system level.

Step 404 of the method 400 includes releasing the fire extinguishing agent 112 to the fluidic oscillator 120. In the example of FIG. 6, release of the fire extinguishing agent 112 from the storage vessel 104 is facilitated by an agent discharge initiator 108 mounted on the vessel outlet 106 of the storage vessel 104. The agent discharge initiator 108 may be activated by a controller 102 after the controller 102 receives a command signal from the flight crew. In the example shown, the agent discharge initiator 108 is configured to break the diaphragm that seals the vessel outlet 106, resulting in the pressurant 110 in the storage vessel 104 forcing the fire extinguishing agent 112 into the agent transfer tube 114, and toward to the fluidic oscillator 120. However, the fire extinguishing agent 112 may be released from the storage vessel 104 by other means. For example, as an alternative to an agent discharge initiator 108 as shown in FIG. 6, the fire extinguishing system 100 may include a high-speed valve (not shown) for releasing the fire extinguishing agent 112 from the storage vessel 104.

It should also be noted that FIG. 6 illustrates the fire extinguishing system 100 in a blow-down arrangement, in which the pressure exerted by the pressurant 110 on the fire extinguishing agent 112 gradually decreases as the fire extinguishing system 100 is expelled from the storage vessel 104. However, the fire extinguishing agent 112 may be configured as a steady state system (not shown), in which the fire extinguishing agent 112 is forced through the fluidic oscillator 120 at substantially constant pressure.

Step 406 of the method 400 includes discharging a continuous jet 200 of the fire extinguishing agent 112 from the fluidic oscillator 120, while oscillating the jet 200 back and forth through the sweep angle 202, as shown in FIG. 7. More specifically, as illustrated in the above-described FIGS. 12-18, step 406 comprises receiving, at the power nozzle 140 of the fluidic oscillator 120, the fire extinguishing agent 112 from the storage vessel 104, and directing the main flow 148 of the fire extinguishing agent 112 into the mixing region 156 and toward the exit throat 150. Step 406 further includes alternately causing, using the pair of flow separators 160, a portion of the main flow 148 (i.e., the feedback flow 182) to enter the channel entrance 174 of the feedback channel 166 defined by the flow separator 160 (FIG. 12), and exit the feedback channel 166 proximate the power nozzle 140 (FIG. 13) in a manner that the feedback flow 182 facilitates the generation of a separation vortex 184 (FIG. 14) that, when large enough, pushes the main flow 148 across the mixture region and against the flow separator 160 on the opposite side of the mixing region 156 (FIG. 15), causing the jet 200 to change direction across the sweep angle 202. The above-described process (e.g., FIGS. 12-18) continues in an uninterrupted manner until the flow of fire extinguishing agent 112 into the fluidic oscillator 120 is substantially reduced or stops.

Step 406 of discharging the jet 200 comprises oscillating the jet 200 through a desired sweep angle 202. In the above-describe example of FIG. 7, the jet 200 is oscillated at a sweep angle 202 of approximately 60 degrees. In some examples, the design variables of the internal geometry may be such that the jet 200 oscillates at a sweep angle 202 in the range of 30-120 degrees. However, as noted above, the internal geometry may be such that the jet 200 oscillates at a sweep angle 202 of less than 30 degrees, or greater than 120 degrees.

Step 406 of discharging the jet 200 additionally comprises oscillating the jet 200 at an oscillating frequency in the range of 5-20 Hz, such as at an oscillating frequency of approximately Hz. However, as noted above, the jet 200 may oscillate at an oscillating frequency of less than Hz, or greater than 20 Hz, depending upon the internal geometry, the flow rate of the fire extinguishing agent 112, and/or other variables. Furthermore, step 406 of discharging the jet 200 comprises discharging the jet 200 in a manner causing the jet 200 to break up into droplets 204 having a droplet size (e.g., a diameter) in the range of less than 150 microns. However, the jet 200 may be discharged in a manner causing the droplets to break up into a droplet size of greater than 150 microns.

As mentioned above, the internal geometry of the fluidic oscillator 120 provides multiple design variables that can be adjusted (i.e., in the design process) to cause the fluidic oscillator 120 to discharge the jet 200 at the desired flow characteristics. For example, the area of the power nozzle 140, the width of the control nozzle 142, the size and shape of the flow separators 160, the length of the feedback channels 166, the area of the exit throat 150, the aspect ratio of exit throat width 152 to exit throat height 154, and/or other variables can be adjusted to cause the jet 200 to be discharged at any desired velocity, mass flow rate, sweep angle 202, oscillation frequency, and/or droplet size.

In the context of an aircraft 300, step 406 of discharging the jet 200 comprises discharging a continuous jet 200 of the fire extinguishing agent 112 into an engine compartment 322 of a turbine engine 318 (e.g., FIGS. 3-5) or into an APU compartment 308 containing an APU 306 (FIG. 1). In the example of FIG. 3, step 406 of discharging the jet 200 into an engine compartment 322 includes discharging the jet 200 into a region of a fan case 328 between the fan cowl 330 and the fan duct outer wall 332. In the example of FIG. 5, step 406 of discharging the jet 200 comprises discharging the jet 200 into the region between the fan duct inner wall 334 and the engine core 338. As mentioned above, the fluidic oscillator 120 is configured to discharge any one of a variety of different types of fire extinguishing agents 112, including liquid fire extinguishing agent, and/or liquid/gas fire extinguishing agent. In one example, step 406 of discharging the jet 200 comprises discharging trifluoroiodomethane, fluoroketone, pentafluoroethane, bromotrifluoromethane, or sodium bicarbonate.

Regardless of the chemical composition of the fire extinguishing agent 112, the fluidic oscillator 120 atomizes the fire extinguishing agent 112 into a stream of droplets 204 that break up into relatively small droplet sizes, resulting in an increase in the aggregate surface area of the fire extinguishing agent 112, relative to the aggregate surface area of fire extinguishing agent discharged as a plume from a conventional fire suppression system (not shown), as mentioned above. In the presently-disclosed fire extinguishing system 100, the sweeping jet 200 from the fluidic oscillator 120 improves the speed of vaporization phase change of the fire extinguishing agent 112, relative to the speed of vaporization phase change of a static (i.e., fixed and non-sweeping) low-pressure plume discharged in a single direction by a conventional fire suppression system. In this regard, the plume from a conventional fire suppression system is obstructed from shearing and mixing with ambient air. The obstruction of the plume prevents the agent from penetrating into needed areas. In contrast, the sweeping jet 200 emitted by the fluidic oscillator 120 of the presently-disclosed fire extinguishing system 100 allows the fire extinguishing agent 112 to penetrate the local environment to get the mixture of fire extinguishing agent 112 and air to needed locations at the required volumetric concentration levels (e.g., 5 percent) within a short time period (e.g., on the order of seconds).

For the example where the fluidic oscillator 120 is installed in an engine compartment 322 of a turbine engine 318 of an aircraft 300, the oscillating jet 200 discharged by the fluidic oscillator 120 is capable of targeting specific areas of complex engine geometry without the need for multiple nozzles pointed in different directions. In this regard, the presently-disclosed fire extinguishing system 100 may result in an overall reduction in weight relative to conventional fire suppression systems. In addition, the effectiveness of the oscillating jet 200 may allow for a reduction in the amount of fire extinguishing agent 112 that is needed for a given application.

Furthermore, the oscillating jet 200 is capable of providing very good distribution of fire extinguishing agent 112 over a wide range of temperatures, and in a manner which allows penetration of the fire extinguishing agent 112 into pockets, nooks, and crannies of an engine compartment 322. As mentioned above, the internal geometry of the fluidic oscillator 120 provides multiple design variables that can be adjusted (i.e., during the design process) so that the fluidic oscillator 120 achieves the desired flow characteristics of the jet 200, such as the desired sweep angle 202, mass flow rate, and oscillation frequency. In this regard, the internal geometry of the fluidic oscillator 120 can be tailored to provide an optimized solution for any type of fire extinguishing agent 112.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. An aircraft, comprising:
   a turbofan engine having:
      a fan duct outer wall surrounding rotatable fan blades and configured to receive an air flow;
      a fan duct inner wall surrounding an engine core located downstream of the fan blades, the fan duct inner wall and the engine core defining an annular gap configured to receive a core flow as a portion of the air flow;
   a storage vessel configured to contain a fire extinguishing agent in a liquid form; and
   a fluidic oscillator configured to receive the fire extinguishing agent from the storage vessel, and discharge a continuous jet of the fire extinguishing agent into the core flow passing through the annular gap while oscillating the jet back and forth through a sweep angle.

2. The aircraft of claim 1, further comprising:
   an agent transfer tube fluidically coupling the storage vessel to the fluidic oscillator.

3. The aircraft of claim 1, wherein:
   the fluidic oscillator is configured to oscillate the jet through the sweep angle in the range of 30-120 degrees.

4. The aircraft of claim 1, wherein:
   the fluidic oscillator is configured to oscillate the jet at an oscillating frequency in the range of 5-20 Hz.

5. The aircraft of claim 1, wherein:
   the fluidic oscillator is configured to discharge the jet in a manner causing the jet to break up into droplets having a droplet size of less than 150 microns.

6. The aircraft of claim 1, wherein the fluidic oscillator is mounted above the engine core, and is configured such that the jet distributes the fire extinguishing agent alternately on opposite sides of the engine core.

7. The aircraft of claim 1, wherein the fluidic oscillator comprises:

a main body having a power nozzle and an exit throat;

an internal cavity containing a pair of flow separators separating a mixing region respectively from a pair of feedback channels, each of the feedback channels has a channel entrance at the exit throat, and a channel exit at the power nozzle;

the power nozzle is configured to receive the fire extinguishing agent from the storage vessel, and direct a main flow of the fire extinguishing agent into the mixing region; and each flow separator is configured to alternately cause a portion of the main flow to enter the channel entrance of the feedback channel defined by the flow separator, and exit the feedback channel at the power nozzle in a manner generating a separation vortex that pushes the main flow across the mixing region and toward the flow separator on an opposite side of the mixing region, causing the jet to change direction across the sweep angle.

8. The aircraft of claim 7, wherein:

the main body terminates at the exit throat where the jet is discharged.

9. The aircraft of claim 7, wherein:

the fluidic oscillator is symmetrical about a central axis centered on the power nozzle and the exit throat.

10. The aircraft of claim 1, wherein:

the storage vessel contains one of the following compounds as the fire extinguishing agent: trifluoroiodomethane, fluoroketone, pentafluoroethane, or bromotrifluoromethane.

11. A method of extinguishing a fire, the method comprising:

providing the aircraft of claim 1;

storing fire extinguishing agent in the storage vessel;

receiving, from the storage vessel, the fire extinguishing agent at the fluidic oscillator; and discharging the continuous jet of the fire extinguishing agent from the fluidic oscillator into the core flow while oscillating the jet back and forth through the sweep angle.

12. The method of claim 11, wherein discharging the jet comprises:
   oscillating the jet through the sweep angle in the range of 30-120 degrees.

13. The method of claim 11, wherein discharging the jet comprises:
   oscillating the jet at an oscillating frequency in the range of 5-20 Hz.

14. The method of claim 11, wherein discharging the jet comprises:
   discharging the jet in a manner causing the jet to break up into droplets having a droplet size in the range of less than 150 microns.

15. The method of claim 11, wherein discharging the jet comprises:
   discharging one of the following compounds as the fire extinguishing agent: trifluoroiodomethane, fluoroketone, pentafluoroethane, or bromotrifluoromethane.

16. The method of claim 11, wherein the aircraft further comprises an agent transfer tube fluidically coupling the storage vessel to the fluidic oscillator.

17. The method of claim 11, wherein the fluidic oscillator is mounted above the engine core, and is configured such that the jet distributes the fire extinguishing agent alternately on opposite sides of the engine core.

18. The method of claim 11, wherein the fluidic oscillator comprises:
   a main body having a power nozzle and an exit throat;
   an internal cavity containing a pair of flow separators separating a mixing region respectively from a pair of feedback channels, each of the feedback channels has a channel entrance at the exit throat, and a channel exit at the power nozzle;
   the power nozzle is configured to receive the fire extinguishing agent from the storage vessel, and direct a main flow of the fire extinguishing agent into the mixing region; and
   each flow separator is configured to alternately cause a portion of the main flow to enter the channel entrance of the feedback channel defined by the flow separator, and exit the feedback channel at the power nozzle in a manner generating a separation vortex that pushes the main flow across the mixing region and toward the flow separator on an opposite side of the mixing region, causing the jet to change direction across the sweep angle.

19. The method of claim 18, wherein:
   the main body terminates at the exit throat where the jet is discharged.

20. The method of claim 18, wherein:
   the fluidic oscillator is symmetrical about a central axis centered on the power nozzle and the exit throat.

* * * * *